Feb. 7, 1950     G. R. TREMOLADA     2,496,569
WASH PIPE FOR ROTARY SWIVELS

Filed May 9, 1945     3 Sheets-Sheet 1

INVENTOR.
GUGLIELMO R. TREMOLADA
BY
ATTORNEY

Feb. 7, 1950 G. R. TREMOLADA 2,496,569
WASH PIPE FOR ROTARY SWIVELS
Filed May 9, 1945 3 Sheets-Sheet 2
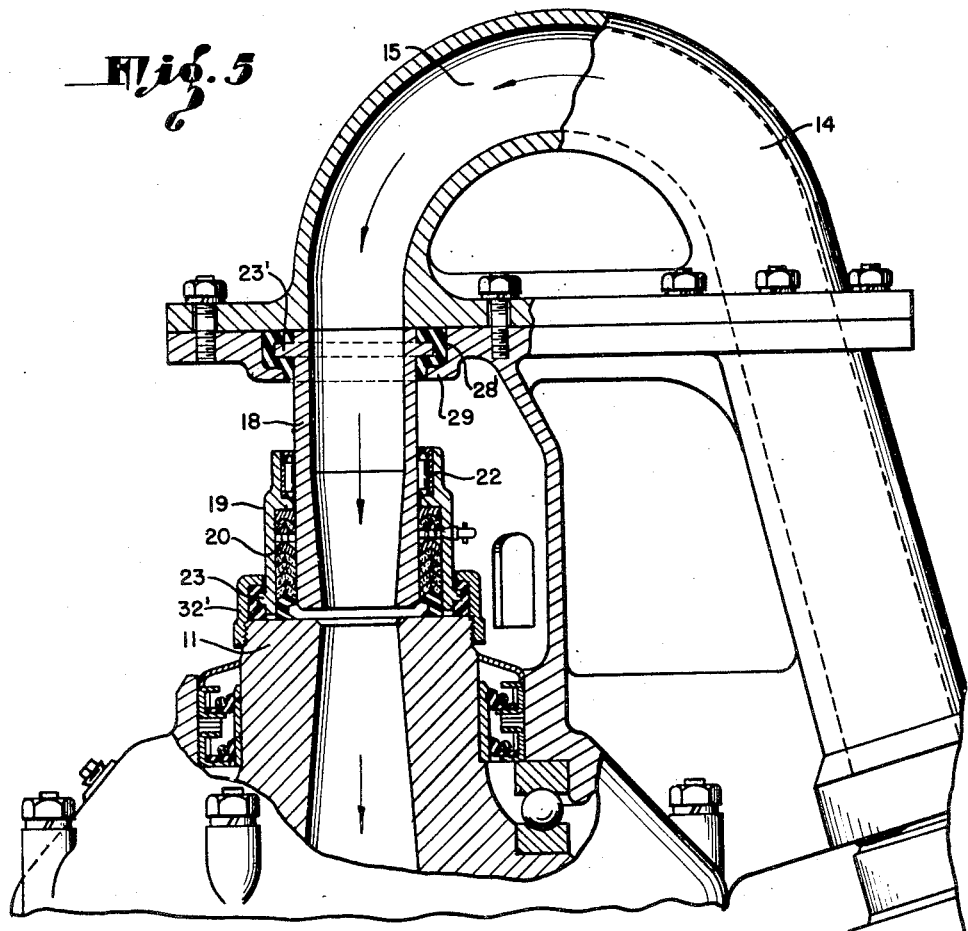
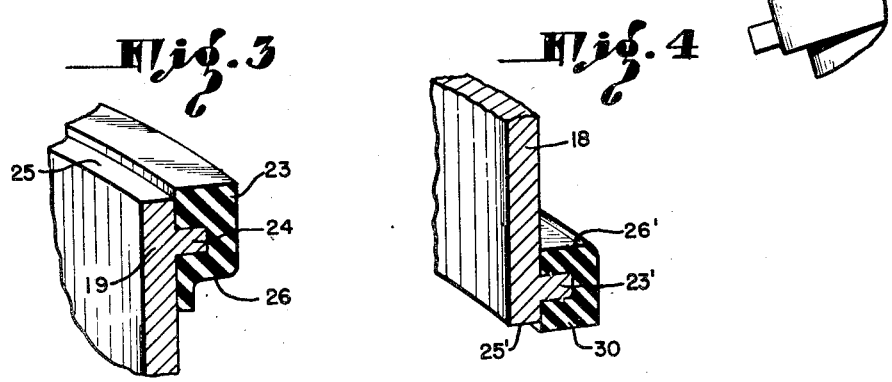
INVENTOR.
GUGLIELMO R. TREMOLADA
BY
ATTORNEY

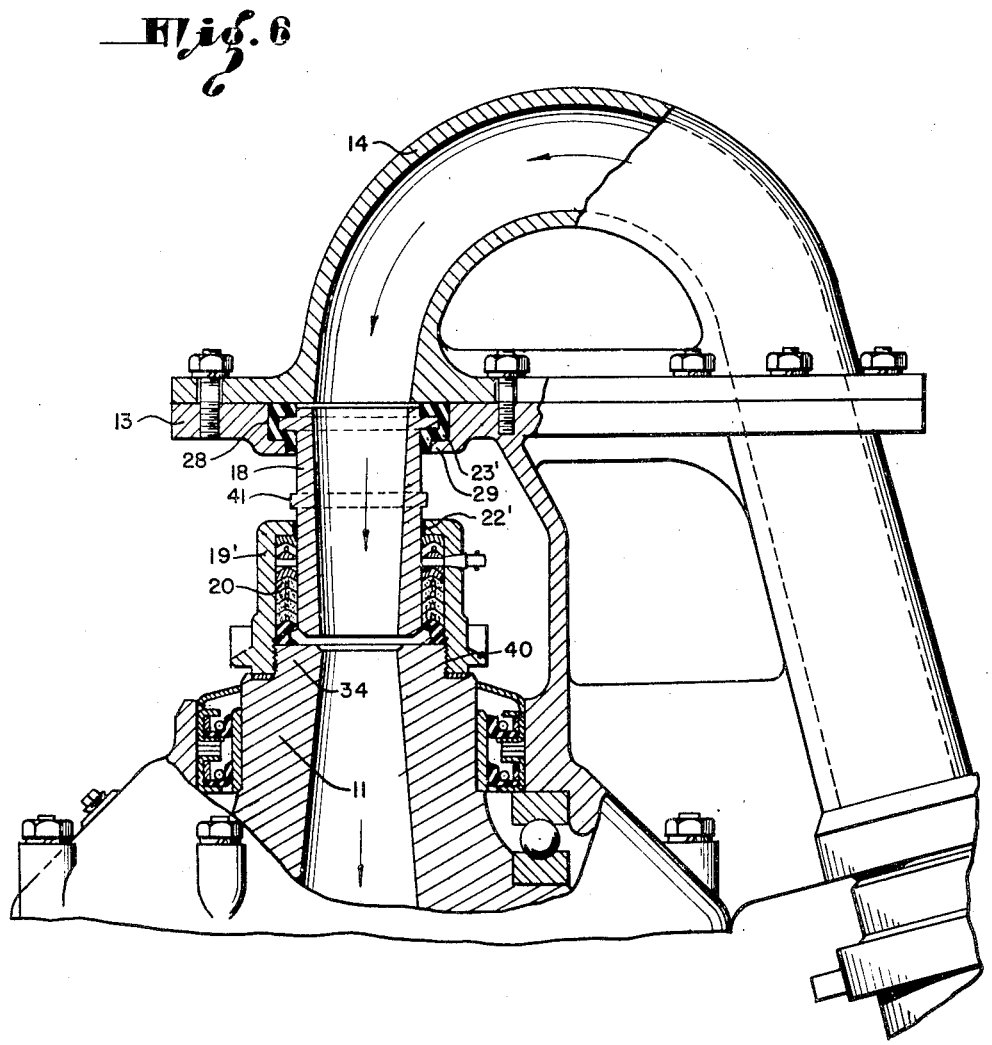

Patented Feb. 7, 1950

2,496,569

UNITED STATES PATENT OFFICE 2,496,569

WASH PIPE FOR ROTARY SWIVELS

Guglielmo R. Tremolada, Los Angeles, Calif., assignor to Emsco Derrick & Equipment Company, Los Angeles, Calif., a corporation of California Application May 9, 1945, Serial No. 592,905

15 Claims. (Cl. 285—97.1)

This invention relates in general to swivels of the type used in rotary well drilling to support a string of drill pipe during the rotary well drilling operation, and relates in particular to an improved wash pipe connection in such swivel for conveying fluid, such as drilling mud, from the relatively stationary to the rotating part of the swivel.

Swivels, as now used in the rotary method of drilling, have a shell or body with a rotatable part or member carried therein by thrust and radial bearings. This rotatable member has a passage extending axially therethrough and is connected to the upper end of the string of drill pipe. On the top of the shell of the swivel there is a gooseneck having therein a passage which is connected to the rotary hose through which the mud is transferred from the mud pump to the swivel. Between the gooseneck and the rotatable member of the swivel, there is a swivel fluid connection for conveying the mud, or other fluid, under pressure from the passage of the wash pipe to the passage of the rotatable member. This fluid swivel connection includes the wash pipe proper, which comprises a short tube which extends into and rotates relatively to another annular or tubular part, there being packing means between these relatively rotatable parts of the fluid swivel connection to prevent leakage. This packing must operate under conditions of high pressure so that the wear imposed thereon is relatively severe. Also, the wear or destruction of the packing means is increased by the pounding action on the packing resulting from disalignment of the relatively rotating parts of the swivel fluid connection. Although the relatively rotatable parts of the swivel may be quite accurately aligned when the swivel is new, disalignment of the parts very often develops after the swivel has been in use for a period of time, for wear of the bearings of the swivel and small distortions of co-operating parts thereof will result in eccentricity of the relatively rotatable parts of the swivel during use of the swivel.

It is an object of the present invention to provide a swivel having a wash pipe connection so formed that the destructive action upon the packing means of the wash pipe connection, as the result of eccentricity of the relatively rotatable parts of the device, will be minimized, thereby increasing the useful life of the packing and reducing the frequency of replacement of cooperating parts of the wash pipe connection.

It is an object of the invention to provide a wash pipe connection for a rotary swivel, the parts of which may be removed and replaced with relative ease.

An object of the invention is to provide a wash pipe of this character comprising a pair of relatively rotatable annular or tubular parts, with packing means therebetween, at least one of these annular or tubular parts being yieldably supported so that it may have a compensating movement to compensate for disalignment of the relatively rotatable parts of the swivel, and there being radial bearing means operative between the annular or tubular parts of the wash pipe connection tending to maintain concentricity of these parts during relative rotation thereof, the result of this arrangement being that a reasonable concentricity is maintained between the relatively rotatable parts of the wash pipe connection, even though there may be eccentricity of the relatively rotatable parts of the swivel to which the cooperating parts of the wash pipe connection are connected.

It is also an object of the invention to provide a wash pipe connection for a rotary swivel having a pair of annular or tubular parts, one or both of which are yieldably and flexibly connected to relatively rotatable parts of the rotary swivel, and radial bearing means between these annular or tubular parts to maintain concentricity thereof during the operation of the rotary swivel.

It is also an object of the invention to provide an annular tubular part for a wash pipe connection of the general character described herein, comprising an annular tubular wall having thereon an encircling body of rubbery material by which the annular tubular part may be connected to a part of the swivel in such manner that the annular tubular wall will be positively attached yet yieldably supported upon such part of the swivel and will also serve to seal off the corresponding end of the wash pipe connection.

Further objects and advantages of the invention will be brought out in the following part of the specification.

Referring to the drawings which are for illustrative purposes only,

Fig. 3 is an enlarged fragmentary sectional perspective view showing the yieldable supporting element on the end of the outer annular or tubular part of the wash pipe connection.

Fig. 4 is an enlarged fragmentary sectional perspective view showing the yieldable supporting element on the end of the inner tubular part of the wash pipe connection.

Fig. 5 is a fragmentary partly sectioned view of the upper part of a swivel embodying an alternative form of my invention.

Fig. 6 is a fragmentary sectional view showing a form of my invention wherein one of the cooperating tubular parts of the wash pipe connection is yieldably supported.

Figures 1, 2:
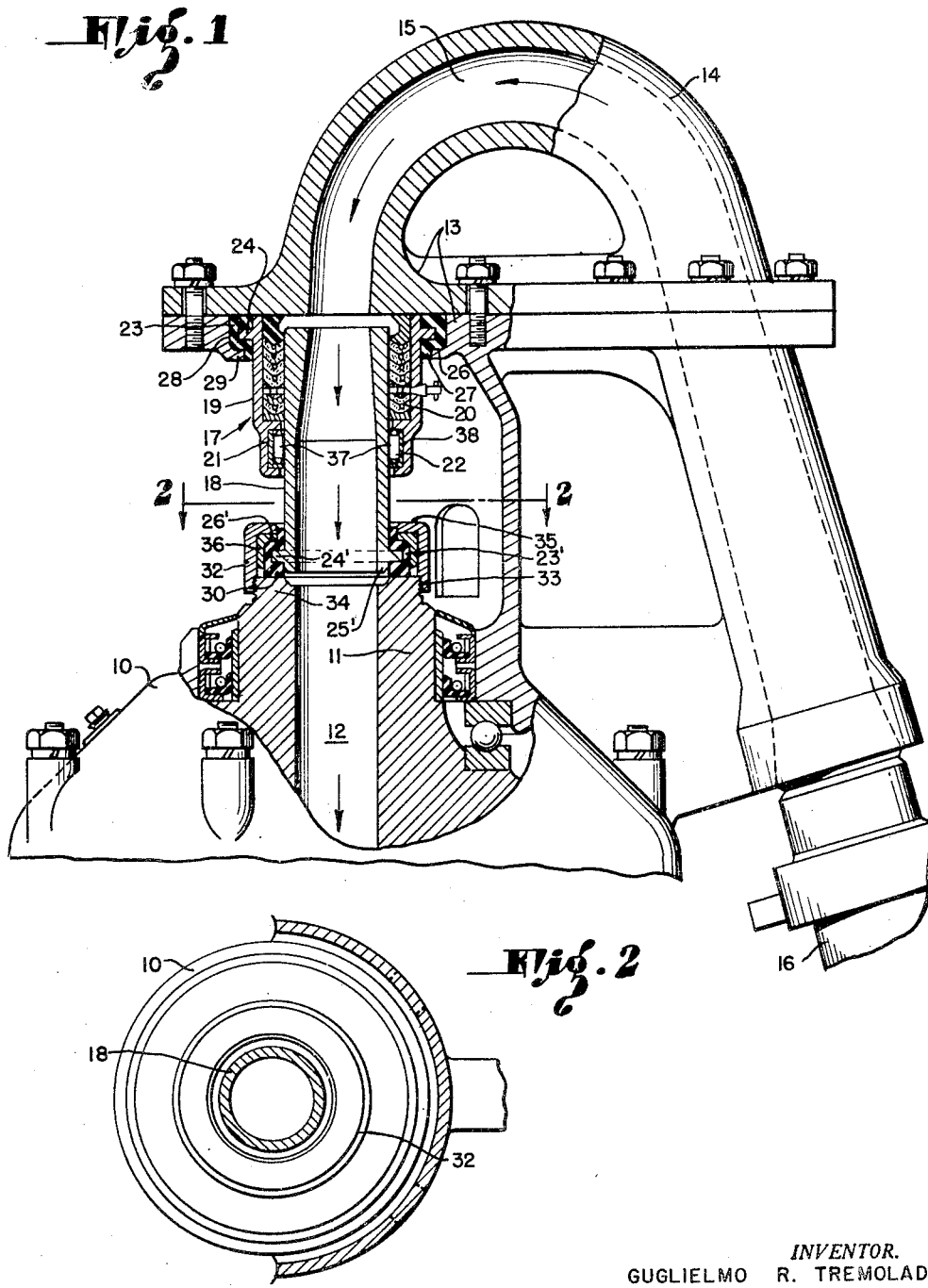
Fig. 1 is a fragmentary partly sectioned view of the upper portion of the rotary swivel, showing a preferred form of my invention.
Fig. 2 is a cross section taken as indicated by the line 2—2 of Fig. 1.

In Fig. 1 I show the upper part of the shell or body 10 of a rotary swivel. In keeping with customary practice, a rotary member 11 is supported by bearings within the body 10, this rotary member 11 having an axial passage 12 from end to end thereof through which the drilling fluid, ordinarily referred to as drilling mud, is conveyed to the upper end of the string of drill pipe which is connected to the lower end of the rotary member 11, so that as the string of drill pipe is rotated, the member 11 will rotate within the body 10. The body 10 has thereon a stationary member 13 which is disposed in spaced relation to the upper end of the rotatable member 11. This stationary member 13 includes a gooseneck 14 having therein a mud passage 15 which receives the mud from a rotary hose 16.

To carry the mud from the passage 15 in the stationary part 13 to the passage 12 in the rotatable part 11, a wash pipe connection 17 is provided, this wash pipe connection consisting of a tubular part 18 which is yieldably connected to the upper end of the rotatable member 11 so as to extend toward the relatively stationary part 13, and tubular part 19 which is yieldably connected to the stationary member 13 in a position to telescope or lap the upper portion of the tubular part 18. Packing 20 is disposed in the space between the tubular parts 18 and 19 to prevent leakage through this space, and within the lower end of the tubular part 19 there is a counterbore 21 to hold radial bearing means 22 in position to engage the tubular part 18, this radial bearing means 22 having the purpose of preserving concentricity between the parts 18 and 19 so that there will be a minimum of gyration of the upper end of the inner tubular part 18 or pounding action of the upper end of the tubular part 18 against the packing 20.

The means for yieldably supporting the upper tubular part 19 consists of a ring 23 of rubbery material having the general form shown in Fig. 3. By rubbery material I mean a substance having the general characteristics of rubber as to the qualities of yieldability or deformation, flexibility, and a reasonable measure of resilience. Accordingly, this rubbery material may be natural rubber compound or one of the synthetic rubbers or rubber substitutes. The ring 23 of rubbery material is locked onto the outer surface of the tubular member 19. For this purpose I show an annular rib 24 on the member 19 for interengagement with the body of the ring 23, and in the practice of the invention the ring is molded and secured in place on the end of the tubular part 19 so as to be bonded thereto. As best shown in Fig. 3, the ring 23 projects slightly above the upper end 25 of the part 19 so as to provide an annular portion for engagement with the lower face of the gooseneck part 14 so as to seal around the upper end of the tubular part 19, and below the plane of the annular rib 24, the ring 23 is reduced in diameter so as to produce a downwardly faced shoulder 26 and an extension 27 having an external diameter materially less than the external diameter of the rib 24. The stationary part 13, Fig. 1, has therein a counterbored opening 28 to receive the ring 23, this opening 28 being so formed as to provide a shoulder 29 to overlap and take the downward thrust of the rib 24 and to confront the shoulder 26 of the ring 23, whereby downward movement of the ring 23 is limited, and when the gooseneck portion 14 of the stationary part 13 is bolted into place, the ring 23 will be compressed within the annular space or cavity defined by the walls of the opening 28. On the lower end of the inner tubular part 18, as shown in Figs. 1 and 4, there is a similar ring 23' of yieldable characteristics, this ring 23' providing an upwardly faced shoulder 26' and a portion 30 which projects below the lower end 25' of the tubular part 18. Interengagement between the tubular part 18 and the ring 23' is provided by an annular rib 24' formed on the lower part of the outer surface of the part 18.

As shown in Fig. 1, the yieldable supporting element 23' is connected to the upper end of the rotatable member 11 by means of an annular fitting 32 having threaded engagement at 33 with the wall 34 at the upper end of the member 11 surrounding the upper end of the passage 12. This fitting 32 has an inwardly turned lip 35 which surrounds the upper portion of the member 23', and between the fitting 32 and the yieldable supporting member 23' there is a metal ring 36 which is formed over the shoulder 26' of the ring 23', and provides a surface upon which the fitting 32 may slide as it is screwed into place so as to clamp the lower end of the ring 23' tightly against the wall 34 of the rotatable member 11.

The bearing means 22 shown in Fig. 1 is a roller type bearing having a plurality of rollers 37 which roll upon the outer surface of the member 18 and are retained within an outer race 38 disposed within the counterbore 21 at the lower end of the outer tubular part 19, in spaced relation to the packing means 20, which is of replaceable character.

When the gooseneck portion 14, Fig. 1, is removed from the position shown, the upper end of the opening 28 will be exposed and the upper tubular part 19 may be removed from operative position, for replacement of the packing 20, by moving this tubular part 19 vertically upwardly from the position in which it is shown in Fig. 1, whereby it will be lifted from the opening 28 and completely removed, if desired, from the inner tubular part 18, which inner tubular part 18 may be left in place, or may be removed should the wear which it has sustained indicate the advisability of its replacement.

In the form of the invention shown in Fig. 5, the same numerals will be employed for those parts which have been previously identified in Fig. 1, wherein the inner tubular part 18 has been shown attached to the rotatable member 11 so that during use of the swivel, the inner tubular part 18 rotates within the outer tubular part 19. In the form of the invention shown in Fig. 5, the inner tubular part 18 is held stationary and the outer tubular part 19 rotates around the lower portion thereof. In Fig. 5 the parts 18 and 19 are inverted from the positions in which they are shown in Fig. 1, the ring 23' of rubbery material on the end of the inner tubular part 18 being received in an opening 28' in the stationary structure 13 and extending downward toward the upper end of the rotatable member 11. A threaded ring fitting 32' surrounds the rubber ring 23 at the end of the outer tubular part 19 and secures the same to the upper end of the rotary member 11. The tubular parts 18 and 19 are lapped or in telescoping relation and radial bearing means 22 is operative therebetween for preserving concentricity of the parts 18 and 19 and thereby reducing the rate of wear or destruction of the packing means 20. In the foregoing specification the manner of using a roller type radial bearing has been shown. In Fig. 6 I show the lower end of the outer tubular member 19' provided with a plain grease lubricated bearing 22' formed integrally with the upper end of the outer tubular part 19' in a position to engage the surface of the inner tubular part 18.

In the form of the invention shown in Fig. 6, only one of the tubular parts of the wash pipe connection is yieldably supported—namely, the inner tubular part—which has the relatively large annular yieldable mounting element 23' disposed on its upper end. In this form of the invention I provide an outer tubular part 19' having internal threads 40 on its lower end to engage the threaded projection 34' at the upper end of the rotary part 11 of the swivel. Otherwise, the outer rotary part 19' has the same characteristics as the outer rotary part previously described herein, in that it has an annular cavity to receive a packing unit 20 and has bearing means 22 at its outer end for engagement with the exterior of the inner tubular part 18 to preserve alignment of the inner tubular part 18 with the rotary member 11 of the swivel, any eccentricity of the parts 18 and 13 being absorbed by the yieldable mounting ring 23'. A further feature of the invention is the provision of means for readily removing the inner tubular part 18 when it is desired to replace the packing unit 20, Fig. 6. For this purpose a shoulder 41 is provided on the inner tubular part 18 above the upper end of the outer tubular part 19'. When the gooseneck portion 14 is removed, the outer tubular part 19 may be screwed upwardly so as to engage the shoulder 41 and break the mounting ring 21' loose from the walls of the opening 28 in the stationary part 13, or a pry bar may be inserted between the lower portion of the shoulder 41 and the upper face of the outer tubular part 19 to pry the inner tubular part 18 upward for the same purpose. After the inner tubular part 18 is removed from the position in which it is shown in Fig. 6, the outer tubular part 19' may be unscrewed and taken to a bench whereat the old packing unit 20 may be removed and a new packing unit in cartridge form inserted in the cavity of the outer tubular part 19', thereby avoiding the difficulties often encountered in repacking rotary swivels, wherein the cage or shell which holds the packing is a fixed part of the swivel structure, requiring that the workman perform the operation of replacing the packing at the location of the swivel instead of conveniently at a work bench. Sometimes, in old swivel constructions, it is necessary for a workman to repack the wash pipe while hanging from a line suspended in the derrick. All such difficulties are avoided in my improved wash pipe connection for the reason that the part which holds the packing may be conveniently removed from the swivel structure and repacked under favorable working conditions.

I claim as my invention:

1. In a wash pipe connection for a rotary swivel having a body, a rotary member supported by said body, and a stationary member supported by said body in spaced relation to said rotary member, said members having fluid passages which are to be connected, the combination of: a first tubular part yieldably connected to one of said members and extending toward the other of said members; a second tubular part yieldably connected to the other of said members and telescoping said first tubular part so that one of said parts will extend within the other of said parts; packing means disposed between said parts to seal off the annular space between the same; and a radial bearing operative between said parts to maintain concentricity of said parts during relative rotation thereof, thereby avoiding destructive pounding action on said packing means.

2. In a wash pipe connection for a rotary swivel having a body, a rotary member supported by said body, and a stationary member supported by said body in spaced relation to said rotary member, said members having fluid passages which are to be connected, the combination of: a first tubular part yieldably connected to one of said members and extending toward the other of said members; a second tubular part yieldably connected to the other of said members and lapping the other of said parts to a point intermediate its ends so that one of said parts will extend within the other of said parts; packing means disposed between said parts to seal off the annular space between the same; and a radial bearing operative between the end portion of said second part and the intermediate portion of said first part to maintain concentricity of said parts during relative rotation thereof, thereby avoiding destructive pounding action on said packing means.

3. In a wash pipe connection for a rotary swivel having a body, a rotary member supported by said body, and a stationary member supported by said body in spaced relation to said rotary member, said members having fluid passages which are to be connected, the combination of: a first tubular part extending from one of said members toward the other of said members; a ring of rubbery material fixed on and connecting the contiguous end of said first part to one of said members; a second tubular part connected to the other of said members and telescoping said first tubular part so that one of said parts will extend within the other of said parts; packing means disposed between said parts to seal off the annular space between the same; and a radial bearing operative between said parts to maintain concentricity of said parts during relative rotation thereof, thereby avoiding destructive pounding action on said packing means.

4. In a wash pipe connection for a rotary swivel having a body, a rotary member supported by said body, and a stationary member supported by said body in spaced relation to said rotary member, said members having fluid passages which are to be connected, the combination of: a first tubular part extending from one of said members toward the other of said members; a ring of rubbery material connecting the contiguous end of said first part to said member, said ring having interlocking engagement with said first part; a second tubular part extending from the other of said members and telescoping said first tubular part so that one of said parts will extend within the other of said parts; a second ring of rubbery material connecting the contiguous end of said second part to said other of said members, said second ring having interlocking engagement with said second part; packing means disposed between said parts to seal off the annular space between the same; and a radial bearing operative between said parts to maintain concentricity of said parts during relative rotation thereof, thereby avoiding destructive pounding action on said packing means.

5. In a wash pipe connection for a rotary swivel having a body, a rotary member supported by said body, and a stationary member supported by said body in spaced relation to said rotary member, said members having fluid passages which are to be connected, the combination of: a first tubular part extending from one of said members toward the other of said members; a ring of rubbery material connecting the contiguous end of said first part to said member; a second tubular part extending from the other of said members and lapping the other of said parts to a point intermediate its ends so that one of said parts will extend within the other of said parts; a ring of rubbery material connecting the contiguous end of said second part to said other of said members; packing means disposed between said parts to seal off the annular space between the same; and a radial bearing operative between the end portion of said second part and the intermediate portion of said first part to maintain concentricity of said parts during relative rotation thereof, thereby avoiding destructive pounding action on said packing means.

6. In a wash pipe connection for a rotary swivel having a body, a rotary member supported by said body, and a stationary member supported by said body in spaced relation to said rotary member, said members having fluid passages which are to be connected, the combination of: first and second tubular wash pipe parts having their inner ends in telescoping relation and being disposed so as to connect said passages of said members of the rotary swivel; and means for flexibly connecting the outer ends of said parts to said members whereby said wash pipe parts may cooperate on a wash pipe axis independently of the positions of the axes of said passages.

7. In a rotary swivel having a rotary member with a passage therein and a stationary member with a passage therein substantially aligned with the first named passage, a component of a wash pipe structure having tubular parts in telescoping relation adapted to cooperate on a wash pipe axis which takes its position independently of the positions of the axes of said passages, comprising: a tubular wall formed so that it will telescope another part of said wash pipe structure; and a ring of rubbery material mounted on the outer end of said tubular wall whereby it may be flexibly connected to one of said members of the rotary swivel, said tubular wall and said ring of rubbery material having wall portions in interlocking engagement to resist relative axial movement of said ring and said tubular wall.

8. In a rotary swivel having a rotary member with a passage therein and a stationary member with a passage therein substantially aligned with the first named passage, a component of a wash pipe structure having tubular parts in telescoping relation adapted to cooperate on a wash pipe axis which takes its position independently of the positions of the axes of said passages, comprising: a tubular wall formed so that it will telescope another part of said wash pipe structure; a ring of rubbery material mounted on the outer end of said tubular wall whereby it may be flexibly connected to one of said members of the rotary swivel, said tubular wall and said ring of rubbery material having wall portions in interlocking engagement to resist relative axial movement of said ring and said tubular wall; and means at the other end of said tubular wall for holding a radial bearing for engagement with the other part of said wash pipe structure.

9. In a rotary swivel having a rotary member with a passage therein and a stationary member with a passage therein substantially aligned with the first named passage, a component of a wash pipe structure having tubular parts in telescoping relation adapted to cooperate on a wash pipe axis which takes its position independently of the positions of the axes of said passages, comprising: a tubular wall formed so that it will telescope another part of said wash pipe structure; a ring of rubbery material mounted on the outer end of said tubular wall whereby it may be flexibly connected to one of said members of the rotary swivel, said tubular wall and said ring of rubbery material having wall portions in interlocking engagement to resist relative axial movement of said ring and said tubular wall; and a radial bearing at the other end of said tubular wall for engagement with the other tubular part of said wash pipe structure.

10. In a wash pipe connection for a rotary swivel having a body, a rotary member supported by said body, and a stationary member supported by said body in spaced relation to said rotary member, said members having fluid passages which are to be connected, one of said members having an opening aligned and in communication with the passage therein and the other of said members having a wall around the mouth of the passage therein, the combination of: a tubular part having on one end thereof a ring of rubbery material to fit into said opening whereby said tubular part may be flexibly connected to the member having said opening therein, and positioned so as to extend toward the other of said members; a second tubular part to lap the unsecured end portion of said first tubular part, said second tubular part having on an end thereof a ring of rubbery material; a fitting surrounding said last named ring of rubbery material and being connected to said wall so as to secure said second part to the member having said wall around the mouth of its passage; and packing means between said tubular parts.

11. In a wash pipe connection for a rotary swivel having a body, a rotary member supported by said body, and a stationary member supported by said body in spaced relation to said rotary member, said members having fluid passages which are to be connected, the combination of: a first tubular part connected to one of said members and extending toward the other of said members; a second tubular part connected to the other of said members and telescoping said first tubular part so that one of said parts will extend within the other of said parts, the inner of said tubular parts having an external exposed shoulder for engagement adjacent the outer end of the other of said parts whereby force may be applied to produce axial movement of said inner part; and packing means disposed between said parts to seal off the annular space between the same.

12. In a swivel fluid connection unit for a rotary swivel, the combination of: a cylindric wash pipe having a ring of rubbery material on one end thereof, said ring providing a forwardly faced shoulder; a clamping ring to engage said shoulder; and a packing element surrounding the other end of said wash pipe, said packing element comprising a shell forming a packing space, a packing means in said space and a compressing ring of rubbery material in the outer end of said space, said compressing ring having a cylindric wall to engage the wall of said shell, an inwardly directed sealing lip at the outer end of said compressing ring and an inwardly directed sealing lip at the inner end of said compressing ring, there being a bead on the inner end of said compressing ring to engage said packing means.

13. A wash pipe for a rotary swivel having packing means, said wash pipe comprising a tubular wall of durable material having a ring of rubbery material fixed on one end thereof as a supporting element for the wash pipe, said ring being formed so as to provide a forwardly faced shoulder and the surface of said tubular wall being prepared for engagement by said packing means.

14. A wash pipe for a rotary swivel having packing means, said wash pipe comprising a tubular wall of durable material having a ring of rubbery material fixed on one end thereof as a supporting element for the wash pipe and having radial wall means projecting into said ring, said ring being formed so as to provide a forwardly faced shoulder, and the surface of said tubular wall being prepared for engagement by said packing means.

15. For a swivel fluid connection unit for a rotary swivel having a cylindric wash pipe connected at one of its ends to a part of the rotary swivel: a packing element to surround the other end of said wash pipe, said packing element comprising a shell forming a packing space, a packing means in said space and a compressing ring of rubbery material in the outer end of said space, said compressing ring having a cylindric wall to engage the wall of said shell, an inwardly directed sealing lip at the outer end of said compressing ring and an inwardly directed sealing lip at the inner end of said compressing ring, there being a bead on the inner end of said compressing ring to engage said packing means.

GUGLIELMO R. TREMOLADA.

REFERENCES CITED

The following references are of record in the file of this patent:

UNITED STATES PATENTS

| Number | Name | Date |
| --- | --- | --- |
| 1,783,410 | Cowell | Dec. 2, 1930 |
| 1,830,440 | Morgan | Nov. 3, 1931 |
| 2,029,598 | Timbs | Feb. 4, 1936 |
| 2,269,431 | Allen | Jan. 13, 1942 |